Feb. 14, 1950

R. L. HANSON 2,497,770

TRANSISTOR-MICROPHONE

Filed Dec. 29, 1948

INVENTOR
R. L. HANSON
BY
Harry C. Hart
ATTORNEY

Patented Feb. 14, 1950

2,497,770

UNITED STATES PATENT OFFICE 2,497,770

TRANSISTOR-MICROPHONE

Robert L. Hanson, Summit, N. J., assignor to Bell Telephone Laboratories, Incorporated, New York, N. Y., a corporation of New York Application December 29, 1948, Serial No. 67,936

11 Claims. (Cl. 179—121)

This invention relates to novel apparatus and methods for translating mechanical vibrations into electrical variations.

The principal object of the invention is to transform mechanical vibrations such as sound waves into electrical variations in a novel manner.

A related object is to obtain amplification of the transformed mechanical variations simultaneously with the transformation.

Another object is to provide an electromechanical transducer which is extremely compact in size and light in weight.

Another object is to provide an electromechanical transducer having a high output power level and a high sensitivity.

The invention utilizes as its central element a semi-conductor amplifier. This element comprises a small block of semi-conductor material such as germanium having, in its original form, three electrodes electrically coupled thereto, which are termed the emitter electrode, the collector electrode and the base electrode. The emitter and the collector may be point contact electrodes making rectifier contact with the block, while the base electrode may be a plated metal film providing a low resistance contact. The emitter may be biased for conduction in the forward direction, while the collector is biased for conduction in the reverse direction. Application of a signal to the emitter electrode produces a signal frequency current in the collector and in an external circuit connected thereto which may include a load. By reason of certain phenomena which take place within the block, amplified versions of the voltage, current, and power of the signal appear in the load. The device may take various forms, some of which are described in the following applications for patent:

| Application | Ser. No. | Filing Date |
|---|---|---|
| J. Bardeen-W. H. Brattain Now abandoned in favor of. | 11,165 | Feb. 26, 1948 |
| J. Bardeen-W. H. Brattain continuation in part of the above application | 33,466 | June 17, 1948 |
| J. Bardeen | 11,166 | Feb. 26, 1948 |
| J. N. Shive | 44,241 | Aug. 14, 1948 |
| W. E. Kock-R. L. Wallace, Jr. | 45,023 | Aug. 19, 1948 |

The device in all of its forms has received the appellation "Transistor" and will be so designated in the present application.

Various circuit applications adapting this device to particular uses are described in the following applications for patent:

| Application | Ser. No. | Filing Date |
|---|---|---|
| H. L. Barney-R. C. Mathes (now patent 2,486,776, issued November 1, 1949) | 22,854 | Apr. 23, 1948 |
| H. L. Barney (now patent 2,476,323, issued July 19, 1949) | 22,276 | Apr. 21, 1948 |
| A. J. Rack | 27,890 | May 19, 1948 |
| R. L. Wallace, Jr. | 45,024 | Aug. 19, 1948 |
| R. L. Wallace, Jr. | 64,681 | Dec. 10, 1948 |

The aforementioned application of R. L. Wallace, Jr. Serial No. 45,024, filed August 19, 1948, is based on the discovery that, in addition to their amplifying properties, these devices have microphonic properties as well, in that their electrical characteristics may be greatly affected by a small mechanical alteration of the contact between one of the electrodes, particularly the emitter, and the body of the semiconductor block. The mechanical alteration of the contact may comprise a change in the contact pressure or area or a change in the location of the contact as by sliding, rocking or rolling a suitably shaped electrode over the semiconductor surface, or it may comprise two or more such changes together. In either case the contact alteration may be derived from a microphone diaphragm, a phonograph needle or other vibration-responsive device, and may be imparted to the vibration-sensitive electrode by a suitable mechanical linkage. In operation, the microphonic properties of the device result in a transformation of the input vibrations into variations in the emitter current, the emitter contact resistance, the coupling between the emitter and the collector, or into two or more of these electrical features simultaneously; while, by reason of the amplifying properties of the device, the input vibrations, as thus electrically transformed, reappear in the output circuit at a higher power level.

The later Wallace application, Serial No. 64,681, filed December 10, 1948, furnishes an improvement in the electromechanical transducer of the earlier Wallace application, and is based on the realization that, by the use of certain novel structures which combine the functions of electrical insulation, mechanical support and the transmission of mechanical movement, the simplicity, ruggedness and efficiency which characterize the well-known carbon grain microphone may be turned to account in the construction and operation of a transistor microphone. In that application, a plurality of grains of conducting material such as carbon are adopted as multiple emitter contacts for the transistor, or a similar plurality of grains are adopted as multiple collector contacts, or both. Mounting arrangements are provided which enable the minute movements of a vibration-responsive member such as a microphone diaphragm, a phonograph needle or the like, to be translated into substantial variations of the pressure of the grains of one or the other or both sets against the semiconductor material, and so the generation in a suitably connected load circuit of a signal which is an amplified electrical version of the mechanical signal, for example, a voice wave, which actuates the diaphragm or other responsive member.

The present invention provides an improved construction for a transistor microphone, especially one of the multiple point contact type. It takes advantage of the small size and light weight of the semiconductor block which is the heart of the transistor to simplify the construction and equalize the pressures of the point contact electrodes. In accordance with the invention the semiconductor block which is the heart of the transistor is freely supported between the fixed, stationary point contact electrode or electrodes which bear against one face of the block, and another point contact electrode or electrodes mounted on and movable with a sound-operated diaphragm or other vibration-responsive device. Each of the multiple point contact electrodes may conveniently comprise a plurality of carbon grains or granules. Movement of the diaphragm or other vibration-responsive device initially presses the movable electrodes against the face of the semiconductor block. By reason of this free or "floating" support, this pressure is immediately transmitted by the block to the fixed point contact electrode or electrodes which bear against its opposite face, so that the pressures on the opposite faces are equalized.

The invention will be fully apprehended from the following detailed description of preferred embodiments thereof, taken in connection with the appended drawings, in which.

*Fabrication*

Figure 1:
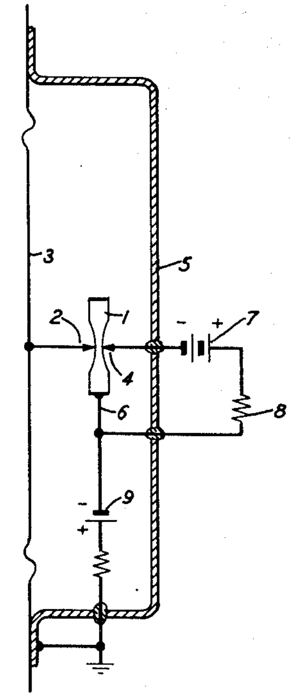
Fig. 1 is a schematic diagram of apparatus illustrating the invention in one form.

Detailed instructions for fabricating a transistor are contained in the patent specifications of the aforementioned applications of J. Bardeen and W. H. Brattain. The following digression, which forms no part of the present invention, is included in this specification to furnish the reader with all information required to fabricate a transistor without the necessity of perusing those specifications. The reader who is already supplied with a transistor with which to carry out the present invention may turn immediately to the section on utilization.

The materials employed in the fabrication of transistors are those semiconductors whose electrical characteristics are largely dependent on the inclusion therein of very small amounts of significant impurities. The expression "significant impurities" is here used to denote those impurities which affect the electrical characteristics of the material such as its resistivity, photosensitivity, rectification, and the like, as distinguished from other impurities which have no apparent effect on these characteristics. The term "impurities" is intended to include intentionally added constituents as well as any which may be included in the basic material as found in nature or as commercially available. Germanium is such a material which, along with some representative impurities, will furnish an illustrative example. Silicon is another such material. In the case of semiconductors which are chemical compounds, such as cuprous oxide ($Cu_2O$) or silicon carbide (SiC), deviations from stoichiometric composition may constitute significant impurities.

Small amounts, i. e., up to 0.1 per cent, of impurities, generally of higher valency than the basic semiconductor material, e. g., phosphorous in silicon, antimony and arsenic in germanium, are termed "donor" impurities because they contribute to the conductivity of the basic material by donating electrons to an unfilled "conduction" energy band in the basic material. In such case the donated negative electrons constitute the carriers of current and the material and its conductivity are said to be of the N-type. Similar small amounts of impurities, generally of lower valency than the basic material, e. g. boron in silicon or aluminum in germanium, are termed "acceptor" impurities because they contribute to the conductivity by "accepting" electrons from the atoms of the basic material in the filled band. Such an acceptance leaves a gap or "hole" in the filled band. By interchange of the borrowed electrons from atom to atom, these positive "holes" effectively move about and constitute the carriers of current, and the material and its conductivity are said to be of the P-type.

It is known how to fabricate a block of silicon of which the main body is of one of these types while a thin surface layer, separated from the main body by a high resistance barrier, is of the other type. For methods of preparing such silicon, as well as for certain uses of the same, reference may be made to an application of J. H. Scaff and H. C. Theuerer, filed December 24, 1947, Serial No. 793,744 and to United States Patents 2,402,661 and 2,402,662 to R. S. Ohl. Such materials are suitable for use in connection with the present invention. It is preferred, however, to describe the preparation of the material which was employed when the discovery of the transistor was made, namely, N-type germanium which has been so treated as to enable it to withstand high voltage in the reverse direction when used as a point contact rectifier.

This material may be prepared in accordance with the process which forms the subject-matter of an application of J. H. Scaff and H. C. Theuerer, filed December 29, 1945, Serial No. 638,351, and which is further described in "Crystal Rectifiers" by H. C. Torrey and C. A. Whitmer, Radiation Laboratory Series Vol. 15 (McGraw-Hill, 1948). Briefly, germanium dioxide is placed in a porcelain dish and reduced to germanium in a furnace in an atmosphere of hydrogen. After a preliminary low heat, the temperature is raised to 1,000° C. at which the germanium is liquefied and substantially complete reduction takes place. The charge is then rapidly cooled to room temperature, whereupon it may be broken into pieces of convenient size for the next step. The charge is now placed in a graphite crucible and heated to liquefaction in an induction furnace in an atmosphere of helium and then slowly cooled from the bottom upwardly by raising the heating coil at the rate of about 1/8 inch per minute until the charge has fully solidified. It is then cooled to room temperature.

The ingot is next soaked at a low heat of about 500° C. for twenty-four hours in a neutral atmosphere, for example of helium, after which it is allowed to cool to room temperature.

In the resulting heat treated ingot, various parts or zones are of various characteristics. In particular, the central part of the ingot is of N-type material capable of withstanding a "back voltage," in the sense in which this term is employed in the rectifier art, of 100–200 volts. It is this material of which transistors may be made which are especially suitable for practicing the present invention.

This material is next cut into blocks of suitable size and shape for use in connection with the invention. A suitable shape is a disc-shaped block of about ¼ inch diameter and $\frac{1}{32}$ inch thickness. The block is then ground flat on both sides, first with 280 mesh abrasive dust, for example, carborundum, and then with 600 mesh. It is then etched for one minute. The etching solution may consist of 10 cubic centimeters of concentrated nitric acid, 5 cubic centimeters of commercial standard (50 per cent) hydrofluoric acid, and 10 cubic centimeters of water, in which a small amount, e. g., 0.2 gram, of copper nitrate has been dissolved. This etching treatment enables the block to withstand high (rectifier) back voltages.

Next, one side of the block is provided with a coating of metal, for example copper or gold, which constitutes a low resistance electric contact. This may be done by evaporation or electroplating in accordance with well-known techniques. As a precaution against contamination of the other (unplated), side of the block which may have occurred in the course of the plating process, the unplated side may be subjected to a repetition of the etching process.

The block is now given an anodic oxidation treatment, which may be carried out in the following way. The block is placed, plated side down, on a metal bed plate which is connected to the positive terminal of a source of voltage such as a battery, and that part of the upper (unplated) surface which is to be treated is covered with polymerized glycol borate, or other preferably viscous electrolyte in which germanium dioxide is insoluble. An electrode of inert metal, such as silver, is dipped into the liquid without touching the surface of the block, and is connected to a negative battery terminal of about −22.5 volts. Current of about 1 milliampere commences to flow for each square centimeter of block surface, falling to about 0.2 milliampere per $cm.^2$ in about four minutes. The electrode is then connected to the −45 volt battery terminal. The initial current is about 0.7 milliampere per $cm.^2$, falling to 0.2 milliampere per $cm.^2$ in about six minutes. The electrode is then connected to the −90 volt battery terminal. The initial current is now about 0.5 milliampere per $cm.^2$, falling to about 0.15 milliampere per $cm.^2$ in ten to twenty minutes.

The battery is then disconnected, the block is removed and washed clean of the glycol borate with warm water, and dried with fine paper tissue. Finish drying has been successfully carried out by placing the block in a vacuum chamber and applying radiant heat. Either the heat or the vacuum may be sufficient, but both together are known to be. If spot electrodes are required on the upper surface as later described, they may be evaporated on in the course of the finish drying process. The germanium block is now ready for use.

The foregoing process appears to convert a very thin layer of the unplated surface, perhaps $10^{-5}$ cm. in thickness, from N-type material to P-type material. This hypothesis, at least, appears to explain many of the remarkable results which have been obtained, as are fully set forth in the aforementioned Bardeen-Brattain application.

When a block of germanium has been prepared in the foregoing manner, the lower part of the block, whose surface is plated with a metal film, is known to be of N-type. The thin layer at the upper surface manifests P-type conductivity and is therefore believed to be composed of P-type material, in which case, as is well known, the interface separating this P-type layer from the N-type material of the main body of the block behaves like a high resistance rectifying barrier. A first electrode, denoted the emitter, makes contact with the upper face of the block, i. e., with the P-type layer, preferably somewhere near its center, or at least several point diameters removed from the nearest edge. This contact is preferably of the rectifier type. It may comprise a bent wire of springy material, from 0.5 to 5 mils in diameter, preferably pointed at the contact end electrolytically or by grinding. Processes for forming the points on such wires are described in United States Patent 2,430,028 to W. C. Pfann, J. H. Scaff and A. H. White. The point of the wire is brought into contact with the upper surface of the block with a force of 1 to 10 grams, whereupon a cold flow of the metal of the point takes place, causing it to conform to any minute irregularities of the block surface. To this end the wire of the point should be ductile as compared with the material of the block. Tungsten, copper and phosphor bronze are examples of suitable materials.

A second electrode, denoted the collector, makes contact with the upper face of the block very close to the emitter. Best results have been obtained when the separation, measured along the surface of the block, between the collector and the emitter, is from 1 to 10 mils. This electrode should make rectifier contact with the block and may be a pointed spring wire, formed and placed as above described in connection with the emitter. On the other hand, it may comprise a small spot of metal, for example, gold, which has been evaporated onto the upper surface of the block in the course of the final drying operation, and through which a central hole has been pierced or across which a diametral slot has been cut. Evaporation of such a spot or film of metal onto the upper face after completion of the anodic oxidation process described above results in a non-ohmic rectifier junction or connection.

A third connection, serving as a control electrode, is made, by soldering or otherwise, to the metal film which has been plated onto the lower surface of the block.

While the unit is now ready for use, its operation can generally be improved by an electrical forming process, in which a potential in excess of the peak back voltage is applied to either one or both of the point electrodes, i. e., between it and the control electrode. The unit is protected from injury by heavy currents by inclusion of a resistor in series.

Bias voltages are now applied to the electrodes, a small bias, usually positive, on the emitter of the order of a fraction of a volt and a larger negative bias on the collector, usually in the range from −5 to −50 volts, measured, in each case, from the control electrode, i. e., the body of the block, to the point electrode. These bias potentials may be obtained from suitably connected batteries or otherwise, as desired.

This concludes the digression on the fabrication of transistors.

*Utilization*

Referring now to the figures, and in particular to Fig. 1, a block 1 of semiconductor material, such as N-type germanium, prepared and treated as described in the aforesaid Wallace application, Serial No. 64,681, filed December 10, 1948, is suspended between two point contact electrodes, one of which 2 is mounted on, and intimately and electrically coupled to, a movable electrically conducting diaphragm 3, while the other 4 is mounted on a fixed support 5. One of these point contact electrodes, for example the movable one 2 serves as the emitter electrode of the transistor while the other, for example, the fixed one 4 serves as the collector. The collector is electrically connected through a biasing battery 7 and load impedance 8 which may be either resistive or inductive, to the base terminal 6 of the semiconductor block 1. Between the diaphragm 3 and the base terminal 6 is a biasing voltage supply, such as a battery 9 for providing a bias on the emitter 2. If the body is of N-type germanium the polarities of the bias voltage sources 7, 9, will be as shown. Specifically the emitter 2 is maintained slightly positive, of the order of 0.1 volt, relative to the base 6 and the collector 4 is given a bias of from 10 to 100 volts negative relative to the base. The emitter contact and the collector contact may be interchanged, if desired, as between the movable diaphragm and the fixed support.

When a force is exerted on the diaphragm this force is transmitted through the emitter 2 and thence to the point of contact of the emitter 2 against the semiconductor block 1. The block 1, being free to move under the action of the force exerted by the emitter contact, exerts substantially the same force against the collector contact 4. Thus the pressures of the two contacts against the semiconductor block 1 occur simultaneously, and all effects such as increase of contact area or contact resistance resulting from force on the contact points 2, 4, are equally apportioned between the emitter contact and the collector contact. When the force on the diaphragm 3 is varied as by the incidence of a sound wave thereon, the pressures between the two contact points and the block are in phase and vary in a manner corresponding to the pressure variation on the diaphragm due to the sound wave. The microphonic effects resulting from the pressure changes at the emitter and collector points, together with the amplification properties of the transistor, combine to provide across the load impedance 8 an amplified electrical version of the sound wave.

Figure 2:
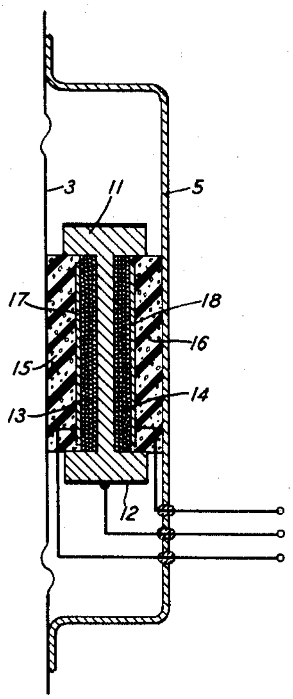
Fig. 2 is a cross-sectional view showing a preferred microphone construction.

Fig. 2 shows a preferred microphone construction which combines the features of the floating transistor of Fig. 1 with the advantages of the multiple point contacts of a carbon grain pile. In this construction, cylindrical recesses are formed, as by grinding, on the two sides of a semiconductor block 11 such as N-type germanium, these recesses being separated by a thin disc of the semiconductor. The periphery of the block is coated with a layer or band 12, of low ohmic resistance material such as rhodium, which forms a base terminal for the transistor. The external electrical circuit may be the same as that of Fig. 1.

The two recesses are partially filled with granules 13, 14 of conducting material, such as carbon, and the two groups of granules are held in place by retaining plugs 15, 16 of a pliable material such as soft rubber. Electrical contact to the two piles of granules is made by means of thin conducting membranes 17, 18 between the rubber 15, 16, and the granules 13, 14. The two sets of conducting granules form multiple emitter and collector contacts against the semiconductor block 11. The assembly is sandwiched between a movable diaphragm 3 and a rigid supporting member 5 in such a manner that when a positive pressure is exerted on the diaphragm 3 there occurs an increase in the contact pressure between the granules of each group and also between the two groups of granules and the semiconductor block 11, these increased pressures occurring simultaneously in all parts. If the pressure on the diaphragm is varied as by the action of an incident sound wave, the pressure variations between granules and between the granules and the semiconductor occur in phase and correspond to the pressure variations in the incident sound wave. Thus an amplified version of the sound wave appears in the external load, as described in connection with Fig. 1. The construction of Fig. 2 offers increased power handling capacity as compared with that of Fig. 1.

What is claimed is:

1. An electromechanical transducer which comprises a movable, vibration-responsive member, a first electrode supported by and movable with said member, a second fixed electrode located oppositely to and axially aligned with said first electrode, a block of semiconductor material engaged by and supported between said electrodes in such fashion that pressures between said electrodes and said block due to movements of said member are equalized by movements of said block, and an external circuit including a potential source and a load interconnecting said electrodes, whereby movements of said member cause the modification, in related conformance with said movements, of currents flowing in said load due to said source.

2. An electromechanical transducer which comprises a movable, vibration-responsive member, a first conductive point contact electrode supported by and movable with said member, a second fixed conductive point contact electrode located oppositely to and axially aligned with said first electrode, a block of semiconductor material supported between and engaged by said point contacts, a third electrode making low resistance contact with said block, and an external circuit including a potential source and a load interconnecting said electrodes, the polarity of said source being selected to establish transistor operating conditions among said electrodes, whereby movements of said member cause the generation in said load of a signal which is an amplified electrical version of said movements.

3. A microphone which comprises a movable diaphragm, a first conductive point contact electrode supported by and movable with said diaphragm, a second fixed conductive point contact electrode located oppositely to and axially aligned with said first electrode, a block of semiconductor material supported between and engaged by said point contacts, a third electrode making low resistance contact with said block, and an external circuit including a potential source and a load interconnecting said electrodes, the polarity of said source being selected to establish transistor operating conditions among said electrodes, whereby movements of said diaphragm cause the generation in said load of a signal which is an amplified electrical version of said movements.

4. An electromechanical transducer which comprises a movable, vibration-responsive member, a first plurality of conductive point contact electrodes supported by and movable with said member, a second plurality of fixed conductive point contact electrodes located oppositely to and axially aligned with said first plurality, a block of semiconductor material supported between and engaged by said pluralities, a third electrode making low resistance contact with said block, and an external circuit including a potential source and a load interconnecting said electrodes, the polarity of said source being selected to establish transistor operating conditions among said electrodes, whereby movements of said member cause the generation in said load of a signal which is an amplified electrical version of said movements.

5. An electromechanical transducer which comprises a movable, vibration-responsive member, a first conductive point contact electrode supported by and movable with said member, a second fixed conductive point contact electrode located oppositely to and axially aligned with said first electrode, and a block of semiconductor material supported between and engaged by said point contacts, whereby pressures of said point contact electrodes on said semiconductor block due to movements of said member are equalized by movements of said block.

6. An electromechanical transducer which comprises a fixed support, a movable vibration responsive member mounted adjacent said support, a container having walls of yielding insulating material mounted between said member and said support in position to be compressed by movements of said member toward said support, a semiconductive body mounted within said container as a partition forming two separate chambers, grains of conducting material substantially filling each of said chambers, whereby pressures of said grains against both sides of said semiconductive partition due to movements of said member are equalized by movements of said partition, a first electrode making contact with the grains on one side of said partition, a second electrode making contact with the grains on the other side of said partition, a third electrode making low resistance contact directly with said partition, and an external circuit including a potential source and a load interconnecting said electrodes, the polarity of said source being selected to establish transistor operating conditions among said electrodes, whereby movements of said member cause the generation in said load of a signal which is an amplified electrical version of said movements.

7. An electromechanical transducer which comprises a fixed support, a movable, vibration responsive member mounted adjacent said support, a container having walls of yielding insulating material mounted between said member and said support in position to be compressed by movements of said member toward said support, a semiconductive body mounted within said container as partition forming two separate chambers, and grains of conducting material substantially filling each of said chambers, whereby movements of said member permitted by the yielding of said container are translated into pressures of said grains against both sides of said semiconductive partition, which pressures are equalized by movements of said partition.

8. An electromechanical transducer which comprises a fixed support of conductive material, a movable diaphragm of conductive material mounted adjacent to and parallel with a face of said support for movement normal to said face, an open-ended cylinder of yielding, insulating material mounted between said support and said diaphragm in position to be axially compressed by movements of said member toward said support, a semiconductive body mounted within said cylinder parallel with said diaphragm and forming a partition which divides the interior of said cylinder into two chambers, one chamber being closed by said face of said fixed support and the other chamber being closed by said diaphragm, grains of conducting material substantially filling each of said chambers, whereby pressures of said grains against both sides of said semiconductive partition due to movements of said diaphragm and permitted by the yielding of said cylinder are equalized by movements of said partition, electrodes making low resistance contact with said diaphragm, said support, and said partition, respectively, and an external circuit including a potential source and a load interconnecting said electrodes, the polarity of said source being selected to establish transistor operating conditions among said electrodes, whereby movements of said diaphragm cause the generation in said load of a signal which is an amplified electrical version of said movements.

9. An electromechanical transducer which comprises a fixed support of conductive material, a movable diaphragm of conductive material mounted adjacent to and parallel with a face of said support for movement normal to said face, an open-ended cylinder of yielding, insulating material mounted between said support and said diaphragm in position to be axially compressed by movements of said member toward said support, a semiconductive body mounted within said cylinder, parallel with said diaphragm and forming a partition which divides the interior of said cylinder into two chambers, one chamber being closed by said face of said fixed support and the other chamber being closed by said diaphragm, and grains of conducting material substantially filling each of said chambers, whereby movements of said diaphragm permitted by the yielding of said cylinder are translated into pressures of said grains against both sides of said semiconductive partition, which pressures are equalized by movements of said partition.

10. A transducer as defined in claim 1, wherein material of the semiconductor block is germanium.

11. A transducer as defined in claim 5 wherein material of the semiconductor block is germanium.

ROBERT. L. HANSON.

REFERENCES CITED

The following references are of record in the file of this patent:

UNITED STATES PATENTS

| Number | Name | Date |
|---|---|---|
| 1,443,620 | Engler | Jan. 30, 1923 |
| 1,626,636 | Slepian | May 3, 1927 |
| 1,887,739 | Mott-Smith | Nov. 15, 1932 |
| 2,296,754 | Wolf | Sept. 22, 1942 |
| 2,444,218 | Carnahan | June 29, 1948 |

OTHER REFERENCES

Electronics, pages 68–71, September 1948.